April 20, 1954     G. A. SCHERRY     2,675,583
AUTOMATIC MOLDING MACHINE

Filed Dec. 28, 1949     7 Sheets-Sheet 1

INVENTOR.
George A. Scherry
BY
Foorman L. Mueller
Atty.

April 20, 1954  G. A. SCHERRY  2,675,583
AUTOMATIC MOLDING MACHINE
Filed Dec. 28, 1949  7 Sheets-Sheet 6

INVENTOR.
George A. Scherry
BY
Foorman L. Mueller
Atty.

Patented Apr. 20, 1954

2,675,583

UNITED STATES PATENT OFFICE 2,675,583

AUTOMATIC MOLDING MACHINE

George A. Scherry, Berkeley, Ill., assignor to Grayhill, Chicago, Ill., a partnership Application December 28, 1949, Serial No. 135,503

13 Claims. (Cl. 18—30)

This invention relates to automatic molding machines and particularly to molding machines for producing plastic objects of small size.

There is a need in the molded plastics industry for a machine which can economically produce small plastic objects in relatively small quantities. In a conventional molding machine the cost of the mold is apt to be a very large item in relation to the value of the individual objects produced by the machine. This is true particularly in the case of small pieces such as plastic switch parts, for example. With present-day molding machines it is not economically feasible to produce small pieces in small quantities due to the high mold cost. Therefore, if a manufacturer wants small plastic parts of special design, he must be prepared to place a very large order for the same with a commercial molder. If, on the other hand, he requires only a relatively small quantity of these parts, say 10,000 units, he may find that the cost of making a mold is too high in proportion to the total dollar value of the order to make the use of plastic articles economically feasible. For this reason, many manufacturers are prevented from using plastic materials in their products even though such materials may be very desirable from many standpoints. Hence, it is apparent that there is a big demand for a good reliable molding machine in which the molds may be inexpensively provided.

Another disadvantage of prior molding machines is that they are not adapted to be loaded automatically with thermosetting molding powders. Each charge of powder must first be compacted by pressure into a pre-form, and the pre-form is fed to the mold generally by hand. Where attempts have been made to use a molding powder direct, trouble has been experienced with premature heating of the powder which tends to cause sticking and binding of the movable parts. Another problem encountered in prior molding machines is the ejection of the molded pieces from the machine. Knockout pins usually are employed to loosen the finished pieces from the mold. In the case of small molded pieces, however, the knockout pins frequently serve as cores in the mold, and the molded pieces tend to stick on these pins, making it difficult to eject these pieces from the mold. In machines of conventional design this slows down the production and there is the danger that broken fragments of mold pieces may remain in the mold and cause injury to the mold in the next operation.

An object of the present invention is to provide an improved plastics molding machine capable of producing small plastic objects in small quantities at an economical cost per unit.

Another object is to provide a small-parts molding machine adapted to utilize small, inexpensive molds having few cavities (two to six, for example), which may be readily applied to the machine.

A further object is to provide a completely automatic molding machine that uses commercial molding powder direct, thereby dispensing with the pre-forming step, and a subsidiary object is to provide improved automatic loading means for discharging a measured amount of powder into a heated mold without subjecting the powder to premature heating.

A still further object is to provide an improved, automatic molding machine with automatic loading and ejecting means and means for preventing the next molding operation from taking place if any fragment of the work has been left in the mold.

A feature of the invention is the provision of an improved molding machine in which the mold proper is separable from the associated parts such as the mold set, the heater plates and transfer cylinder, which are customarily made as a single unit with the mold. By thus separating the mold from its associated parts, it is possible to standardize the mold set and make it a permanent part of the press, leaving only the mold proper that is used for each individual design to be changed when changing from the molding of one item to another. In conventional practice the entire set has to be re-made for each change in design, thereby making the cost of the mold prohibitive for small job lots. It is also time-consuming to make up a complete mold set each time a mold is to be changed, and this is a further reason why commercial molders have been reluctant to accept small orders for specially designed parts.

Another feature is the novel arrangement of the press on a horizontal axis, with a plunger for feeding the charge of molding powder into the mold. This horizontal arrangement facilitates the automatic feeding of the charge and the automatic ejection of the finished work from the press. The hardened plastic is completely ejected from the feed path and from the mold in each operation of the machine, leaving the press in a clean condition and ready to receive the next charge without any time-consuming clean-out interval being necessary.

Still another feature is the automatic loader which transfers each charge of powder from a hopper through a feed channel to a horizontal cylinder in which a piston works. The piston then forces the charge through the cylinder into the heated mold. The heat-conductive path from the mold through the transfer cylinder and the feed channel to the hopper is sufficiently elongated so that the powder in the hopper stays cool to prevent premature liquification and setting thereof.

A further feature is the automatic kickoff mechanism, which derives its power from the moving power parts of the mold set, for positively removing the molded pieces from the ejector pins so that each piece may drop by gravity into a scale where it is weighed.

A still further feature is the automatic weighing mechanism which is very sensitive to very slight differences in the weight of the finished work, it being recalled that this machine is particuarly adapted for molding very small, light pieces. Despite this sensitivity, however, the weighing mechanism develops sufficient mechanical power for operating a control switch or the like in response to the weight of the work, thereby to govern the operation of the machine so that the mold cannot close again if fragments of hardened plastic from the work are left in it.

An additional feature is the completely automatic operation of the molding machine, starting with the loading of the powder into the mold and ending with the delivery of the finished articles to a bin or the like, with each step in this operation taking place without any manual intervention.

The foregoing and other objects, features and advantages of the invention will be appreciated from a study of the detailed description that follows, taken in conjunction with the accompanying drawings, wherein.

In practicing the invention, the entire press, including the mold, the mold set, transfer cylinder and associated parts, is arranged on a horizontal axis so that the charge is fed horizontally into the mold, and the finished pieces are delivered by gravity from the mold to a weighing mechanism. The machine is especially adapted to the molding of thermosetting plastic materials which are provided in powdered or granular form and are molded by the application of heat and pressure. The mold proper, consisting of two mating mold blocks with cavities therein shaped to provide finished pieces of the desired configuration, is separable from the mold set, heater plates, platens and the mechanism for removing molded objects from the mold. In the present machine these latter parts are permanent parts of the press, and are used with all the different molds used. The press includes a transfer cylinder, which likewise is separable from the mold proper and is adjustably positioned in communication with the stationary mold block. A piston or plunger working within this cylinder intermittently feeds charges of molding powder to the heated mold. Each charge is inserted into the cylinder through a feed channel that communicates with a hopper in which a supply of molding powder is kept. The hopper is in a relatively cool location to prevent premature setting of its contents. When the mold is closed, the piston forces the charge through the cylinder into the mold and exerts relatively large pressure thereon so that the powder liquifies, flows into and fills the cavities, and then sets. As the mold opens, knockout pins hold the molded piece or pieces clear of the movable mold block. A special kickoff mechanism, comprising a cam on the movable set and compound-motion linkages following this cam, then moves in and pushes the work from the knockout pins, whereupon the work falls into a chute that leads to the scale pan of the weighing mechanism. The piece is so guided into the pan that its momentum has no effect upon the balance, and only the weight of the piece is effective. If the piece is too light, indicating that a fragment of it has been broken off and possibly left in the mold, the machine automatically shuts down and an alarm is given to the attendant. If the piece has the proper weight, it tips the weighing mechanism past a dead center, and the mechanism is so constructed that the moment arm of the balancing spring progressively decreases as the scale descends under the weight of the piece. Hence, the weight of the piece becomes increasingly effective as the piece is lowered, so that while the balance is very sensitive when the piece is being weighed, there is sufficient momentum to actuate a control switch or like element when the weighing mechanism travels beyond its dead center. The entire machine is automatically controlled in its operation from start to finish so that it does not require the full-time attention of an operator. One mechanic can have charge of a number of machines.

Figure 1:
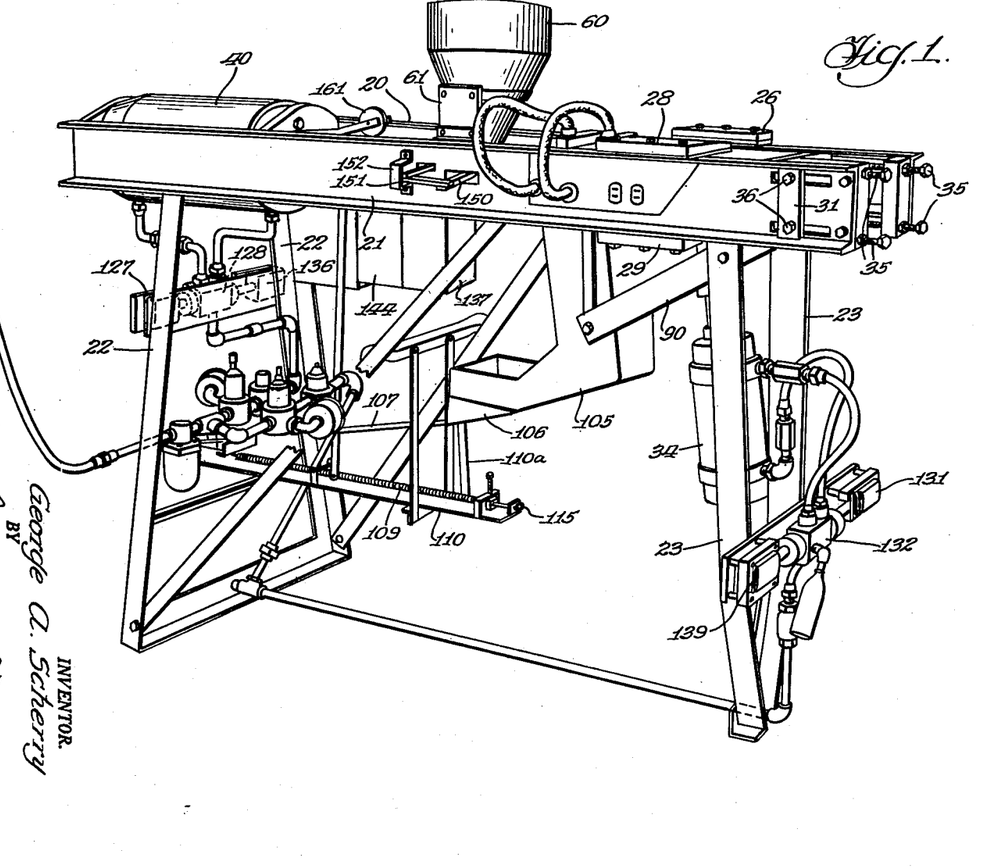
Fig. 1 is a perspective view of an automatic molding machine constructed in accordance with and embodying the principles of the invention.
Figure 2:
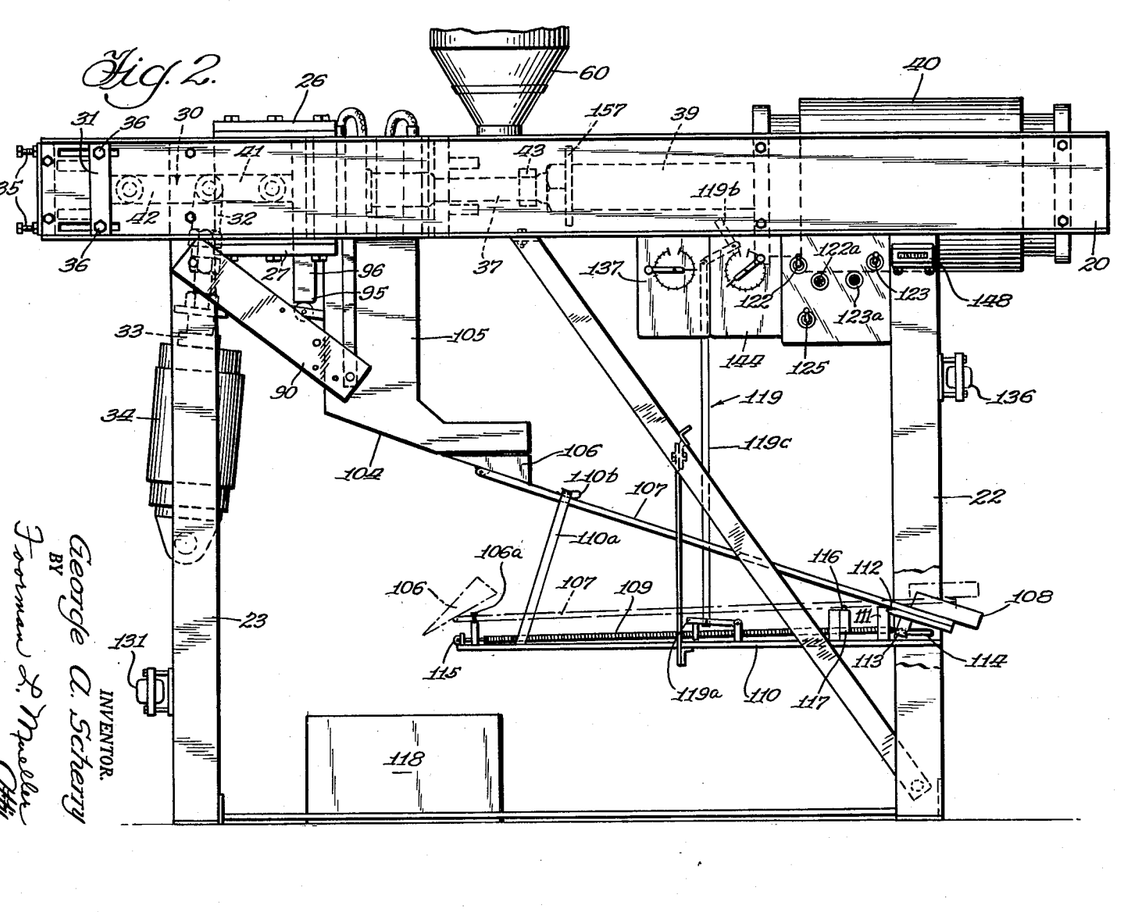
Fig. 2 is a side elevational view of the machine.
Figures 3, 11:
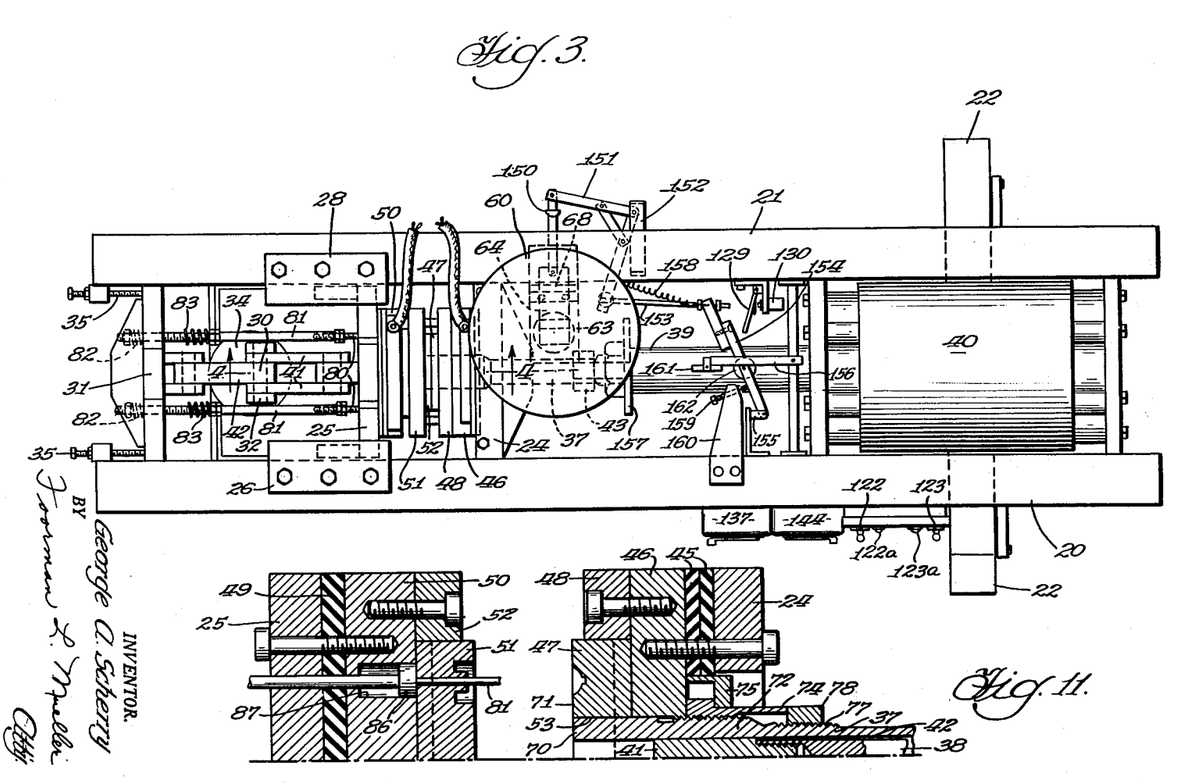
Fig. 3 is a top plan view of the machine.
Fig. 11 is a sectional view along the lines 11—11 of Fig. 6.

The machine illustrated in Figs. 1, 2 and 3 has a horizontal press which is supported by a pair of spaced parallel side rails 20 and 21. The rails 20 and 21 are supported by legs 22 and 23 at a convenient height. Supported on the side rails 20 and 21 are a fixed platen 24 and a movable platen 25 which form the press. The movable platen 25 is slidably supported between the plates 26 and 27 on the rail 20 and between the plates 28 and 29 on the rail 21. For moving the platen 25 a toggle linkage 30 is provided which is secured to a back up plate 31 supported by the rails 20 and 21. The linkage 30 includes links 41 connected to the platen 25, a link 42 connected to the plate 31, and a U-bracket 32 connected to the plunger 33 of air cylinder 34. The back up plate 31 is adjustably positioned by bolts 35 and is further held by screws 36. The adjustment permits the toggle linkage to be operated to provide maximum pressure on the movable platen 25. This mounting also permits easy removal of the back up plate. Mold blocks and associated parts are secured to the platens 24 and 25, as will be more fully described. A transfer cylinder 37 cooperates with the mold block secured to the fixed platen 24 and receives therein a piston 38 which is connected to the plunger 39 of the air cylinder 40.

The construction of the mold assemblies and the cooperation thereof with the fixed and movable platens will be apparent from a consideration of Figs. 3, 4, 6, 8 and 11. Secured to the fixed platen 24 are insulating plates 45, heater plate 46 and mold retainer plate 48 which supports the mold block 47. The movable platen 25 has fixed thereto an insulating plate 49, heater plate 50, and mold retainer plate 52 which supports the mold block 51. The heater plates 46 and 50 include heating cartridges positioned therein, and thermostatic elements for controlling the energization thereof from the electrical circuit of the molding machine.

The mold retainer plates 48 and 52 form a mold set for supporting the mold blocks. The plates 48 and 52 are secured to the heater plates by screws and are readily removable therefrom to permit changing the mold blocks. The mold retainer plate 48 has guide pins 58 secured thereto and the mold retainer plate 52 has openings 59 therein to receive the pins so that mold blocks engage each other in the proper positions. The mold blocks 47 and 51 have recesses 56 and 57 respectively formed therein of such configuration to serve as the parting faces of a cavity mold in which the objects to be constructed are molded. The mold block 47 also includes an opening 53 into which the end 54 of the transfer cylinder 37 extends substantially to the parting face thereof, as shown. The recesses 57 in the mold block 51 are joined by a slot 55 to provide a passage from the transfer cylinder to the molding cavities formed by the mold blocks. Reduced portions or gates are provided in the slot 55 at each cavity so that the runner has small cross-sections at these points and the pieces are easily broken therefrom.

Figures 4, 5:
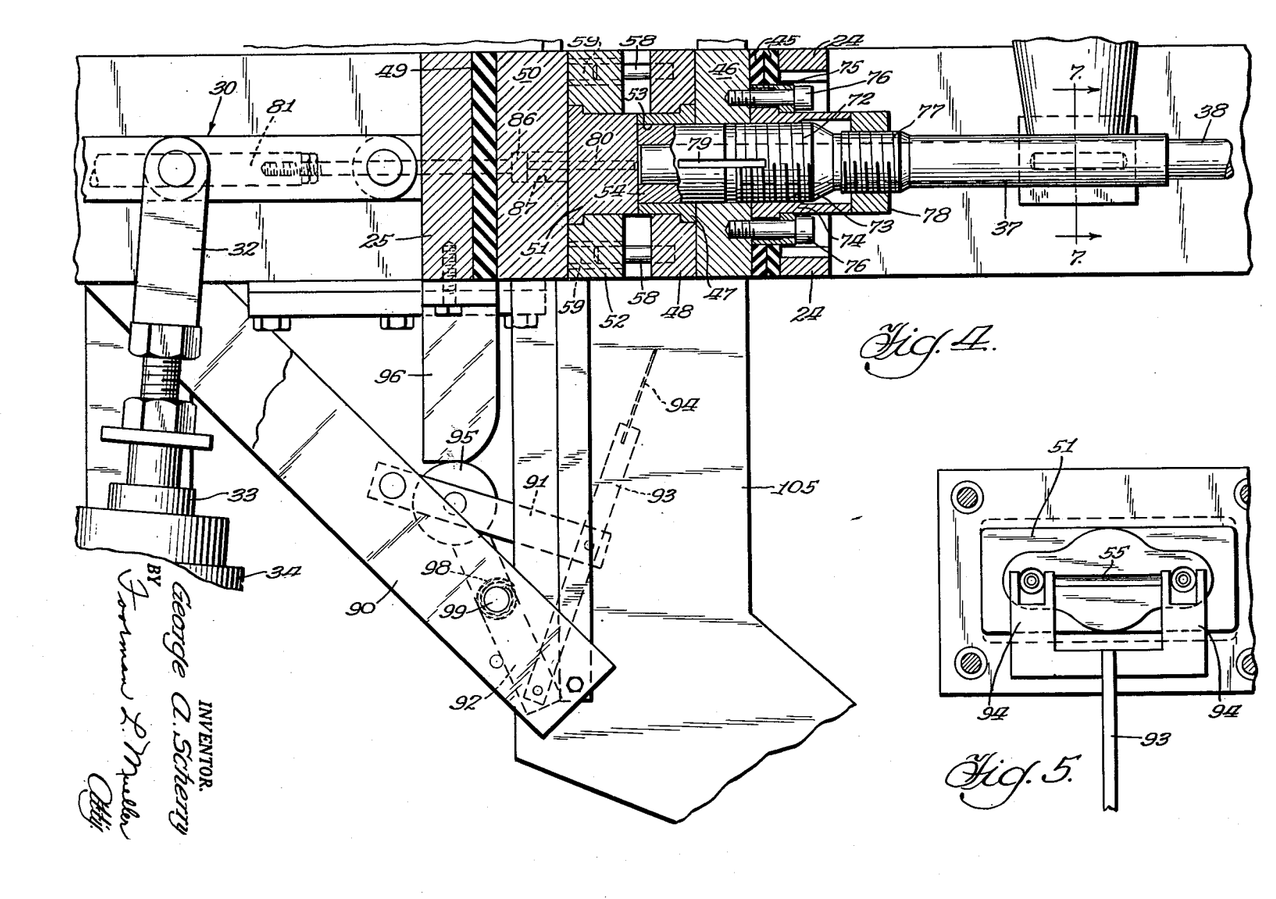
Fig. 4 is a vertical section on the line 4—4 in Fig. 3, with the mold in its closed position.
Fig. 5 is a cross section on the line 5—5 in Fig. 6, showing the kickoff fingers in their elevated positions.
Figure 6:
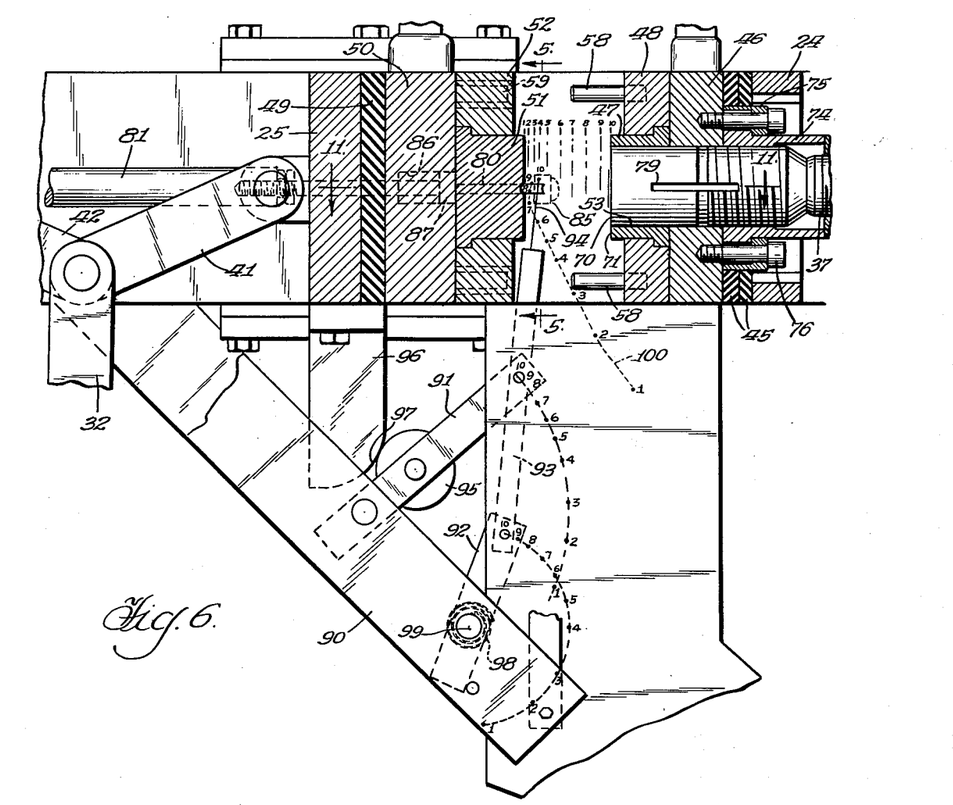
Fig. 6 is a vertical sectional view similar to Fig. 4 but showing the mold in an open position.

As stated above, the transfer cylinder 37 extends within the opening 53 in the mold block 47 (Figs. 4, 6 and 11). For proper operation it is essential that the end face 70 of the cylinder 37 must be flush with the parting face 71 of the mold block 47. To insure that the surfaces are exactly flush with each other, as different mold blocks are used, a threaded portion 72 is provided on the transfer cylinder which cooperates with threads 73 on the securing member 74 which is held against the heater plate 46. By rotation of the member 74, the transfer cylinder may be adjusted so that the end face 70 thereof is exactly flush with the face 71 of the mold block 47. When this desired relationship is obtained, the member 74 may be securely fastened to the heater plate 46 by clamping ring 75 which is held in position by the bolts 76. A threaded portion 77 of smaller diameter is also provided on the transfer cylinder for cooperating with the nut 78 which engages the end of the securing member 74 to provide a locking action. To prevent rotation of the transfer cylinder during adjusting operations, a key 79 is provided which fits in slots in the transfer cylinder and the heater plate 46.

Figure 7:
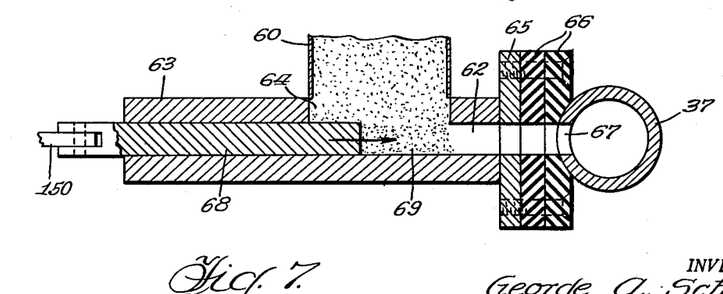
Fig. 7 is a cross section through the feed channel taken on the line 7—7 in Fig. 4.

The material to be molded is introduced into the transfer cylinder 37 from a hopper 60 supported from the side rail 21 by bracket 61 (Figs. 1, 2 and 7). As shown in Fig. 7 a feed channel 62 is provided by the member 63 and has an opening 64 therein which communicates with the bottom of the hopper 60. The channel 62 extends through the metal mounting plate 65 and the heat insulating plates 66 and through an opening 67 in the transfer cylinder 37. A passage is thereby provided from the hopper 60 into the transfer cylinder 37. For providing a fixed amount of molding material into the transfer cylinder, a slide 68 is provided in the channel 62. The thermosetting plastic material to be molded is provided in the hopper in powdered or granular form and will flow into the channel 62, with the amount depending upon the position of the slide 68. When it is desired to place the material into the transfer cylinder, the slide 68 is moved in the direction of the arrow so that the molding powder 69 which has flowed into the channel 62 is introduced into the cylinder 37. The opening in the transfer cylinder for receiving the molding powder is spaced from the heater plate 46 by a considerable distance so that the molding powder will not be heated enough to become liquid. The insulating plates 66 reduce the heat conducted to the material in the hopper 60. After the material is placed in the transfer cylinder it is forced into the cavities within the mold by the plunger 38 which slides within the transfer cylinder 37. The mechanism for operating this slide 68 will be described presently.

Figure 10:
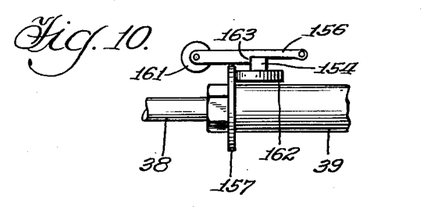
Fig. 10 is a detailed elevational view showing a part of the mechanism for actuating the automatic loader of the machine.

The mechanism for operating the slide 68 for feeding the molding powder into the transfer cylinder 37 is best shown in Figs. 3, 7 and 10. Connected to the slide 68 is an arm 150 which is operated through a crank member 151 pivotally supported by bracket 152 secured to the side rail 21. The crank member 151 is connected to a connecting rod 153 which is also connected to arm 154 pivoted on bracket 155, which is supported on the side rail 20. A latch arm 156 cooperates with the arm 154 to provide the desired movement of the linkage in response to movement of washer 157 connected to the plunger 39 of air cylinder 40. To hold the mechanism in a normal position, a spring 158 is connected between the side rail 21 and the arm 154 and this tends to hold the mechanism in the position with the slide 68 in the outermost position. This position can be accurately controlled by the adjusting screw 159 provided in bracket 160 connected to the side rail 20. When the plunger 39 is moved to the right, the washer 157 will engage the roller 162 on the arm 154 and causes the arm 154 to move in a clockwise direction with the slide being moved toward the transfer cylinder to provide the required charge of molding material in the transfer cylinder. The latch arm 156 has a projection 163 which engages the arm 154 to hold the feeding mechanism in this position. When the plunger 39 moves to the left (Fig. 10) the arm 154 will be retained in the latched position until the washer 157 engages roller 161 on the latch arm. This engagement will cause the latch arm 156 to rise, releasing the arm 154 so that the feeding mechanism, under tension of the spring 158, will pull the slide 68 to the outer position.

The roller 161 is positioned with respect to the washer 157 so that the end of the piston 38 is past the opening 67 in the transfer cylinder before the slide 68 is withdrawn. The slide, therefore, prevents the molding material from being pushed back into the channel 62 when it is moved by the piston 38. The slide 68 is withdrawn, however, as soon as the end of the piston clears the opening 67 so that the slide is removed from the heated transfer cylinder as soon as possible.

As shown in Fig. 11, the transfer piston 38 may be made with a removable end 41 which fits very closely within the transfer cylinder. The remainder of the piston may be undercut as indicated at 42. With this construction only the end 41 will be subject to wear as the piston moves in the cylinder. The removable end 41 may be replaced when worn, or may be replaced by a slightly larger member to compensate for wear of the transfer cylinder. Since only a small portion must be replaced in these instances the cost involved is small. An oiler 43 may be provided at the end of the transfer cylinder having a wick engaging the transfer piston to lubricate the same to thereby reduce wear. Any other suitable oiler mechanism might be used for this purpose.

Figures 8, 9, 12:
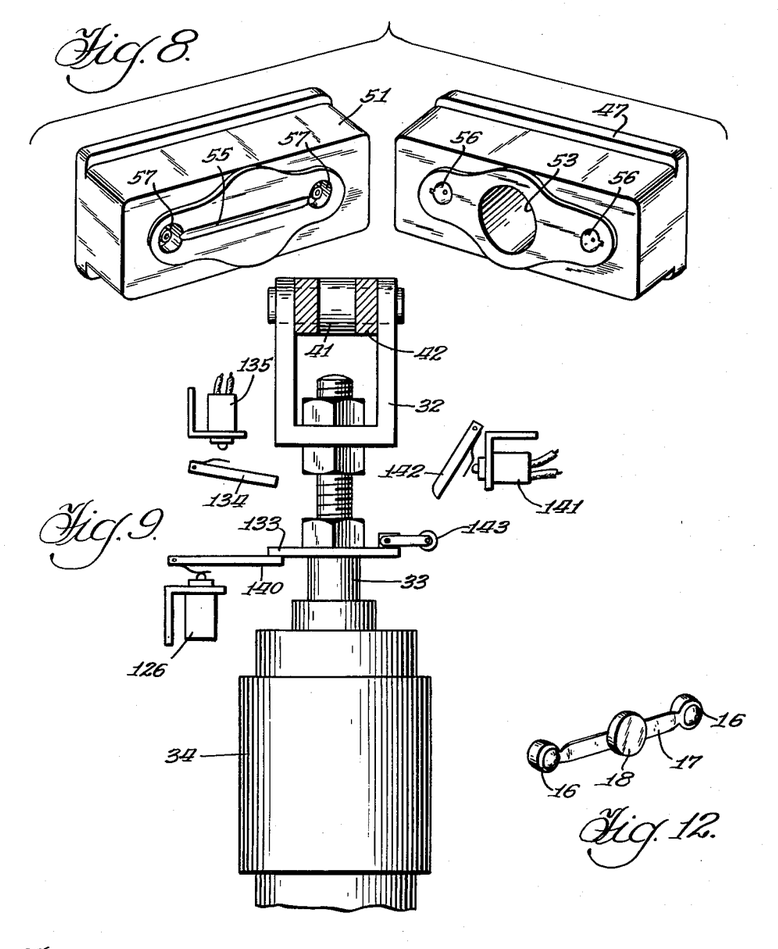
Fig. 8 is a composite view showing a pair of molding blocks which may be used in the machine.
Fig. 9 is a fragmentary elevational view of the air cylinder and associated linkage and control switches.
Fig. 12 is a perspective view of a molded object produced by the machine.

It is believed that the more detailed construction of the molding machine will be more easily understood after the general operation of the machine is set forth. An operating cycle will be described in which the molding powder is introduced into the transfer cylinder 37 by operation of the feeding slide 68. The movable platen is in a position shown in Fig. 4 with the mold blocks 47 and 51 in engagement with each other. The piston 38, operated by the air cylinder 40, forces the powder from the transfer cylinder into the space between the mold blocks 47 and 51, with the powder being forced through the slot 55 into the cavities formed by the recesses 56 and 57. The mold blocks are heated by the heater plates 46 and 50, so that the material is formed into the desired configurations. The movable platen 25 is then retracted, by operation of the air cylinder 34 and the linkage 30, so that the molded member may be removed from the mold. In Fig. 12 there is shown a molded object such as would be constructed by the mold blocks of Fig. 8. The molded pieces 16 are joined by a runner 17 which is formed in the recess 55 and on which there is a slug 18 which is formed in the end of the transfer cylinder. These parts may be easily broken off to provide the desired pieces which are being molded.

Mechanism is provided for automatically removing the molded object from the mold blocks and is illustrated in Figs. 3, 4 and 6. As the movable platen is retracted the piston follows the movement for a short distance so that the slug is forced out of the transfer cylinder and the entire molded object is ejected from the mold block 47. The molded object will normally stick to the mold block 51. For removing the molded object from the mold block 51, knockout pins 80 are provided which extend through the movable platen 25, the insulating plate 46 and heater plate 50 into the recesses 57 of the mold block 51. The knockout pins 80 are secured to rods 81 of a knockout mechanism which includes springs 82 and 83 on the rods 81 to control the movement thereof. As the rear platen 25 is pulled back, the pins 80 and the rods 81 will tend to move back along with the movable platen until the springs 83 engage the plate 31, and this will tend to hold the pins 80 and 81 in a fixed position as the platen 25 is further withdrawn. The spring mounting reduces the necessity for close adjustment of the knockout mechanism. The springs also provide soft, easy pressure so that the likelihood of breakage of the molded object is reduced. This will cause the object 85 which has been molded to be pushed off of the mold block 51 as is shown in Fig. 6. When the platen 25 is later moved to the position for holding the mold blocks together, the pins 80 will be carried along so that the ends of the pins will extend into the recesses 57 in the mold block 51. Enlarged portions 86 are provided on the pins which slide in enlarged openings 87 in the heater plate 50. This prevents the pins from being completely withdrawn from the mold block 51. The ends of the pins are in a position when the mold is closed to form a part of the mold surface and may be effectively used to provide a recess in the molded pieces. The pins 80 are actually a part of the mold and will be provided with each set of mold blocks.

It may be necessary to provide additional means for completely freeing the molded object 85 from the molds. For this purpose a kickoff finger may be provided as illustrated in Figs. 4, 5 and 6. The kickoff finger mechanism is supported by brackets 90 on either side of the molding machine, which are secured to the leg 23. Pivotally mounted on the brackets 90 are a first arm 91 and a second arm 92 interconnected to the ends thereof by an arm 93 having one or more fingers 94 on the end thereof. A spring 98 is provided about the pivot 99 which supports the arm 92 to tend to cause counterclockwise movement of the arm 92. A roller 95 is provided on the arm 91 for engagement with a projection 96 extending downwardly from the movable platen 25. The projection 96 may be adjustably positioned on the platen to compensate for variations in the thickness of the molds. Fig. 4 illustrates the position of the various arms when the movable platen 25 is positioned to hold the mold blocks in engagement. When the platen 25 is withdrawn, as in Fig. 6, the arms 91, 92 and 93 are moved by operation of the spring 98. The roller 95 follows the cam surface 97 on the extension 96 to cause the fingers 94 to move in the path indicated by the dot-dash line 100. This causes the fingers to move between the mold block 51 and the molded object 85 to kick off the object from the knockout pin 80 so that it will drop from the space between the mold blocks. The ends of the fingers 94 can be shaped to cooperate best with the particular objects being molded.

When the molded object is freed from the mold blocks and knockout pins, it is dropped into a guide chute 105 which causes the object to be directed into a pan 106, Figs. 1 and 2. This pan forms the receiving platform of an over center weighing mechanism which includes the balance arm 107, counterbalance 108 and spring 109. The weighing mechanism is supported on a frame 110 having a projection 111 with a groove therein into which a knife edge 112 secured to the balance arm 107 extends. This knife edge and groove form the pivot for the balance arm. A projection 113 is provided on the balance arm 107 also having a groove into which knife edge 114 extends. The spring 109 is supported at one end by an adjustable screw 115 supported on the frame 110 and is connected at the other end to the knife edge member 114. The spring holds the balance arm 107 in a position so that the pan 106 is positioned adjacent the guide chute 105. The bottom surface 104 of the chute 105 extends approximately along the same line as the arm 107 so that the inertia of the falling object does not have an appreciable effect on the weighing mechanism.

When the molded object drops into the pan 106, the balance arm 107 swings in a counterclockwise direction until the arm engages the operating member 116 of switch 117. As the movement of the back part of the pan 106 is arrested by the stop 106a, the pan 106 pivots on the arm 107 to drop the molded object into the receptacle 118. This is shown by the dotted position in Fig. 2. The tension of the spring 109 is such that the arm 107 will not be moved by the weight of the object unless the entire molded object is deposited in the pan 106. Therefore, if only a part of the molded object is removed from the mold and dropped in the pan 106, the weight will not be sufficient to overcome the tension of the spring. This arrangement is used as a safety device to prevent a succeeding molding operation if the complete molded object is not removed from between the mold plates. This safety device prevents injury to the mold which might be caused if the mold plates were moved into engagement with each other when a piece of solid plastic material is still in the space between the mold plates. As will be more fully explained, the switch 117 is connected in the operating circuit of the molding machine.

As previously stated, the weighing mechanism is an over center device so that after the tension of the spring 109 is overcome, the spring helps to pull the arm 107 down so that it has sufficient force to operate the switch 117. To reset the weighing mechanism, a mechanical linkage 119 is provided. This linkage includes arm 119a which is pivoted to the frame 110, a crank member 119b and a connecting rod 119c. The crank member 119b is engaged by the washer 157 on the plunger 39 and rotated clockwise to cause clockwise rotation of the arm 119a. The arm 119a engages the balance arm 107 to move it above center and the spring 109 then causes the balance arm to move to its normal position. The frame 110 includes an arm 110a having a spring 110b thereon which is engaged by the balance arm when it returns to the normal position. The spring provides a resilient stop for the arm which cushions the arm so that the weighing mechanism is not tripped by normal vibrations of the machine.

Figure 13:
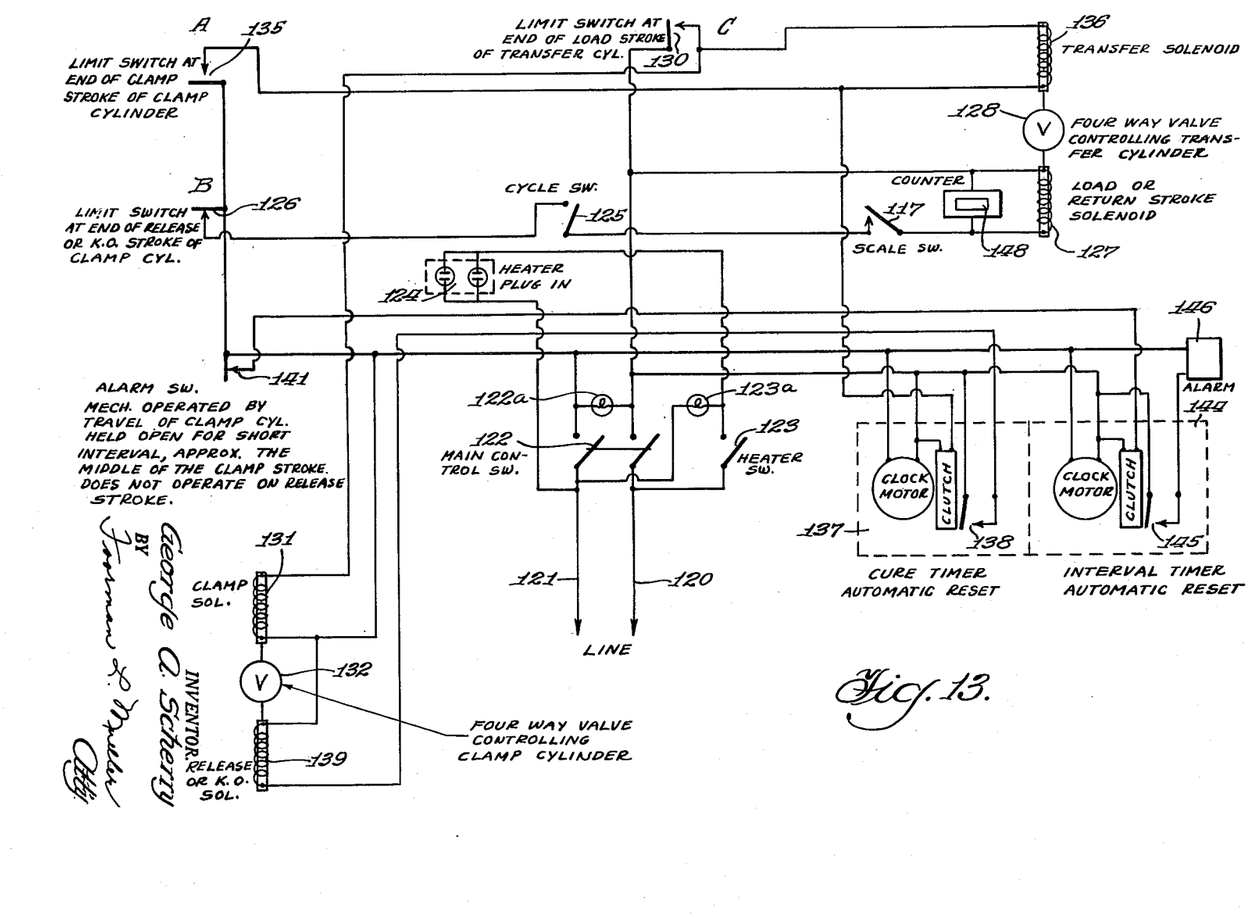
Fig. 13 is a schematic diagram of the electrical circuits in the machine.

Reference is now made to Fig. 13 which shows the circuit of the automatic molding machine. This circuit includes conductors 120 and 121 which may be connected to a standard 60 cycle 110 volt alternating current source. The conductors 120 and 121 are connected to a main control switch 122 and to a heater switch 123. The main switch 122 controls energization of the entire control circuit and the heater switch 123 controls energization of the heater plugs 124 into which connections for the heating elements of the heater plates, previously described, may be inserted.

To start automatic operation of the molding machine, the cycle switch 125 must be closed. The cycle switch is connected in series with the scale switch 117, which is closed when the balance arm is in the tripped position (shown dotted in Fig. 2), and with the limit switch 126. The switches 125, 117 and 126, when closed, energize the return stroke solenoid 127 for operating the valve 128 which is connected to the transfer air cylinder 40. The cylinder then draws the plunger 39 inward to move the piston 38 in the direction away from the mold blocks.

As previously stated, the return movement of the plunger 39 also causes operation of the feeding mechanism to inject a charge of molding powder into the transfer cylinder and causes operation of the linkage 119 to reset the scale or weighing mechanism. The washer 157 on the plunger 39 also engages the arm 129 of switch 130 which energizes the solenoid 131 controlling the valve 132 for the clamp air cylinder 34. This causes the plunger 33 of the clamp air cylinder to be moved upward for clamping the mold plates together through the toggle linkage 30 (Fig. 9). When the plunger 33 is moved to the uppermost position, the washer 133 secured thereto engages switch arm 134 to operate the switch 135 associated therewith. The switches 135 and 130, when both are closed, energize the forward stroke solenoid 136 of the valve 128 to cause the plunger 39 of the transfer air cylinder 40 to be moved outward (to the left) so that the piston 38 forces the charge of molding powder into the mold.

Connected for energizing along with the solenoid 136 is a timer 137 which is thereby set to operate after a predetermined time interval. The construction of the timer is not shown in detail since it may be of any standard construction. The timer 137 includes contacts 138 which are closed thereby after the predetermined time interval which in this case will be set to provide the time necessary for curing of the molded object. The timer contacts 138 cause energization of the release solenoid 139 connected to the valve 132 to cause the plunger 33 of the clamp air cylinder 34 to be drawn in so that the mold is opened. This movement of the mold causes operation of the knockout pins and kickoff fingers to release the molded object from the mold as previously described. When the plunger 33 is at its lowermost position, the washer 33 thereon engages the arm 140 to operate switch 126 associated therewith. If the cycle switch 125 and the scale switch 117 are closed, this will energize the return stroke solenoid 127 to initiate another operation of the machine in the manner set forth above.

If the object molded does not drop into the weighing pan 106 or is not sufficiently heavy to cause the spring to be tripped, this will cause the scale switch 117 to remain open so that the solenoid 127 cannot be energized and the automatic operation will stop. To warn the attendant that the machine has stopped, an alarm system is provided which includes a switch 141 having an arm 142 adapted to be engaged by roller 143 secured to the washer 133. This structure is arranged so that the roller 143 holds the switch 141 open for a short time as the plunger 33 moves upwardly to clamp the mold plates together. This opening the switch contacts 141 opens the circuit through the timer 144 to reset the same. Timer 144 may be of standard construction and may be identical to the timer 137. This timer is set at an interval greater than the normal time required for one operation, so that if the machine operates normally, the timer will be reset again before it will be operated. However, if the operation of the machine is stopped because the scale does not operate or for any other reason, the timer 144 will not be reset and the contacts 145 thereof will operate to energize alarm 146. The alarm 146 may provide any desired signal, audible, visible or otherwise, so that an attendant having other duties will be advised that the molding machine requires attention.

In order to provide a record of the number of objects molded, a counter 148 may be connected across the solenoid 127. A counter might also be connected at other points in the control circuit. This counter may be of any suitable standard construction and for this reason is not described in detail.

It will be apparent from the above description that the molding machine operates completely automatically so that the continuous presence of an attendant or operator is not necessary. The machine is specially adapted for molding small pieces in which a relatively small number of pieces is required, since the molds required for each individual piece may be inexpensively constructed. The saving in mold cost is present, of course, regardless of the number of pieces molded, and the machine has been formed to provide relatively large numbers of pieces economically. This inexpensive construction of the mold is possible because the mold set, heater plates, transfer cylinder and ejecting mechanism are not a part of the mold and need not be replaced each time the mold is changed. The adjustable arrangement for interconnecting the transfer cylinder and the mold permits reasonable tolerances in the construction of the mold to further reduce the cost thereof. The molds are easily changed and adjusted, with these operations being made easier because the back up plate can be removed and more room thereby provided between the platens. The machine is constructed so that the molding material is introduced at a point on the transfer cylinder which is relatively cool permitting the direct use of molding powder without causing the powed to liquify substantially before it is introduced into the mold. This reduces the tendency of the feeding slide to stick. The arrangement for removing the complete molded object including the runner and slug from the mold, and the weighing mechanism which provides a safety control, further facilitate the automatic operation of the machine.

It is to be noted that the machine shown in the drawings and described hereinbefore only illustrates one embodiment of the invention. The invention is not limited to a horizontally positioned press as illustrated but may also be embodied in a vertical press. Although the mold blocks are illustrated as providing two cavities, it will be apparent that only one cavity might be provided, and also, a greater number of cavities than two can be provided. The air cylinders providing movement of the platen and the plunger may obviously be replaced by other available moving means. Also the toggle linkage for operating the movable platen, while desirable in particular applications, may obviously be replaced by other available mechanisms. It is intended that all such equivalent structures and arrangements be included within the scope of the invention, and the invention is to be limited only to the extent defined in the appended claims.

I claim:

1. A molding machine comprising a frame structure, a first platen fixedly supported on said frame structure, a second platen slidably mounted on said frame structure, first and second mold blocks removably secured respectively to said first and second platens, said second platen being movable from a first position in which said second mold block is held in engagement with said first mold block to a second position in which said second mold block is spaced from said first mold block, at least one of said mold blocks having a recess therein to provide a cavity between said mold blocks, said second mold block having at least one opening therein extending into said cavity, a knockout pin positioned in said opening, supporting means for said knockout pin, a cylinder adaptably connected to pass through said first mold block to the parting face thereof and communicating with said cavity, means for introducing a quantity of moldable material into said cylinder, a piston slidable in said cylinder, means for moving said piston substantially to the end of said cylinder in said first mold block for forcing said material into said cavity to mold the same into an object, means for moving said second platen to said second position, said means for moving said piston causing the same to follow the movement of said second platen for a short distance to free said molded object from said first mold block, spring means positioned in engagement with said supporting means and said frame structure for restraining movement of said knockout pin to force said molded object from said second mold block as said second platen moves, a projecting member adjustably secured to said second platen, and ejector means engaging said projecting member and having a portion which moves into the space between said mold block and into engagement with said molded object on the side thereof facing said second mold block in response to said movement of said second platen and moves said object away from said second mold block to thereby free the same from said knockout pin.

2. A molding machine including in combination, first and second vertically positioned molding blocks adapted to be held in engagement with each other, at least one of said blocks having a recess therein so that a cavity is formed between said blocks, a cylinder connected to pass through said first mold block to the parting face thereof and communicating with said cavity, means for introducing movable material into said cylinder, a piston slidable within said cylinder substantially to the end thereof in said first mold block for forcing said material into said cavity, said second mold block having at least one opening therein, a knock-out pin having a portion positioned in said opening and forming part of the parting face of said second mold block, means for moving said second mold block with respect to said first mold block for opening said cavity, means supporting said knock-out pin and resisting movement thereof to force the object molded in said cavity therefrom in response to movement of said second mold, and kick-off means coupled to said second mold block for movement therewith, said kick-off means including pivotally interconnected members having fingers movable into the space between said second mold block and the molded object and movable away from said second mold block and against the molded object for lifting and freeing the same from said knock-out pin.

3. A molding machine including in combination, a frame structure, a first mold block fixedly supported on said frame structure, a second mold block slidably mounted on said frame structure and movable from a first position in engagement with said first mold block to a second position spaced from said first mold block, at least one of said mold blocks having a recess therein to provide a cavity between said blocks, said second mold block having at least one opening therein communicating with said cavity, a knockout pin having a portion positioned in said opening and forming a part of the parting face of said second mold block in the engaged position, a cylinder having an end extending through said first mold block to the parting face thereof and communicating with said cavity, means for providing a quantity of moldable material in said cylinder, a piston slidable in said cylinder substantially to said end thereof for forcing said material into said cavity to mold the same into an object, means for moving said second mold block to said second position, said knockout pin being supported on said frame structure to force said molded object from said cavity in response to movement of said second mold block, and ejector means movable in response to said movement of said second block, said ejector means including a finger portion having a first movement into the space between said mold blocks and a second movement in a direction away from said second mold block for engaging said molded object and freeing the same from said knockout pin.

4. A molding machine including in combination, a frame structure, a first mold block fixedly supported on said frame structure, a second mold block slidably mounted on said frame structure from a first position in engagement with said first mold block to a second position spaced from said first mold block, said first and second mold blocks having recesses therein to provide a cavity therebetween, said second mold block having at least one opening therein extending in a recess thereof, a knockout pin having a portion positioned in said opening and forming a part of the parting face of said second mold block in the engaged position, a cylinder having an end extending through said first mold block to the parting face thereof and communicating with said cavity, means for providing a quantity of moldable material in said cylinder, a piston slidable in said cylinder substantially to said end thereof for forcing said material into said cavity to mold the same into an object, means for moving said second mold block to said second position, said knockout pin being supported on said frame structure to force said molded object from said cavity in response to movement of said second mold block, and ejector means movable in response to said movement of said second block, said ejector means including a finger portion and means for moving the same into the space between said mold blocks and for further moving said finger portion in a direction away from said second mold block for freeing said molded object from said knockout pin.

5. A molding machine including in combination, a frame structure, a first mold block fixedly supported on said frame structure, a second mold block slidably mounted on said frame structure and movable from a first position in engagement with said first mold block to a second position spaced from said first mold block, at least one of said mold blocks having a recess therein to provide a cavity between said blocks, said second mold block having at least one opening therein communicating with said cavity, a knockout pin having a portion positioned in said opening and forming a part of the parting face of said second mold block in the engaged position, a cylinder having an end extending through said first mold block to the parting face thereof and communicating with said cavity, feeding means for providing a quantity of moldable material in said cylinder, a piston slidable in said cylinder substantially to said end thereof for forcing said material into said cavity to mold the same into an object, means for moving said second mold block between said first and second positions, said knockout pin being supported on said frame structure to force said molded object from said cavity in response to movement of said second mold block, to said second position ejector means movable in response to said movement of said second block, said ejector means including a finger portion having a first movement into the space between said mold blocks and a second movement in a direction away from said second mold block for engaging said molded object and freeing the same from said knockout pin, and control means for causing operation of said feeding means, said pistons, and said means for moving said second mold block to provide automatic operation of said machine.

6. A molding machine in accordance with claim 5 wherein said control means include means for receiving the released molded object and operative to stop operation of said machine when said object weighs less than a predetermined amount.

7. A molding machine in accordance with claim 5 wherein said control means includes weighing means having a portion for receiving the released molded object and an overcenter tensioned arm supporting the same, said overcenter arm being movable to a predetermined position when a molded object having a predetermined weight is received in said receiving portion and thereby initiating the next operation of said machine.

8. A molding machine in accordance with claim 5 wherein said control means includes timing means for causing movement of said second mold block to said second position after a predetermined time interval after said piston has moved to said end of said cylinder.

9. A molding machine including in combination, a frame structure, first and second mold blocks having respective parting faces supported on said frame structure, said blocks being movable on said frame structure from an engaged position to a spaced position, at least one of said blocks having a recess in the parting face thereof to form a cavity between said blocks in the engaged position thereof, cylinder means connected to said first mold block and communicating with said cavity for introducing moldable material into said cavity, said second mold block having an aperture extending therethrough and into said cavity, a knockout pin positioned in said aperture and having one end thereof forming part of the parting face of said second mold block in the engaged position of said blocks, means for moving said second mold block with respect to said first mold block to open said cavity, means for arresting movement of said knockout pin upon such movement of said second mold block to cause said pin to project outwardly from said parting face thereof, and kickoff means coupled to said second mold block for movement therewith, said kickoff means including a finger portion and means for moving said finger portion into the space between said parting face of said second mold block and said end of said knockout pin, and then away from said parting face of said second block past said end of said knockout pin.

10. A machine for molding plastic material including in combination, a frame, first and second mounting structures supported on said frame, first and second mold blocks having substantially flat parting faces, said first and second mounting structures including retainer means for removably securing said first and second mold blocks thereto respectively in such positions that said faces are held in engagement with each other, at least one of said blocks having a recess in the face thereof to form a cavity between said blocks in the engaged position of said faces, said first mold block having an opening extending therethrough into said cavity, a cylinder positioned in said opening in said first mold block and extending therethrough to said parting face thereof, said cylinder having an end face adapted to be aligned with said parting face of said first mold block, said first mounting structure including mounting means for supporting said cylinder in said opening in said first mold block with said cylinder being supported independently of said first mold block, said mounting means and said cylinder having interengaging portions adjustable with respect to each other to control the position of said cylinder with respect to said first mold block for aligning said faces thereof, means for introducing plastic moldable material into said cylinder, a piston slidable within said cylinder substantially to said end thereof for forcing the material into said cavity, and means for moving said second mounting structure with respect to said first mounting structure for opening said cavity formed between said mold blocks.

11. A molding machine in accordance with claim 10 wherein said inter-engaging portions of said mounting means and said cylinder including mating threads to provide a fine adjustment of the position of said cylinder with respect to said mounting means.

12. A molding machine in accordance with claim 10 wherein said means for introducing plastic material into said cylinder includes container means for receiving thermosetting plastic moldable material in powder form, channel means interconnecting said container means and said cylinder, and slide means including a plunger portion within said channel for forcing substantially all the material within said channel into said cylinder, said channel means having at least a portion thereof constructed of heat insulated material, and said slide means including a portion connected to said piston for movement therewith and causing movement of said plunger to force the material into said cylinder as said piston is withdrawn therefrom.

13. A machine for molding thermosetting plastic material including in combination, first and second mounting structures, first and second mold blocks having complementary faces secured to said mounting structure respectively in such positions that said faces are held in engagement with each other, at least one of said blocks having a recess in the face thereof to form a cavity between said blocks in the engaged position of said faces, said first mold block having an opening extending therethrough into said cavity, a cylinder positioned in said opening in said first mold block and extending therethrough to said face thereof, said cylinder having an end face adapted to be aligned with said face of said first mold block, mounting means secured to said first mounting structure for supporting said cylinder in said opening in said first mold block, said mounting means and said cylinder having adjustable inter-engaging portions which provide adjustment of the position of said cylinder with respect to said first mold block for aligning said faces thereof, heating means for heating said mold blocks and said cylinder, container means for receiving thermo-setting plastic material in powder form, channel means interconnecting said container means and said cylinder, said channel means having at least a portion thereof constructed of heat insulating material for insulating said container means from the heat of said cylinder, slide means within said channel for forcing substantially all the material within said channel into said cylinder, a piston slidable within said cylinder toward said cavity for forcing substantially all said material in said cylinder into said cavity, said second mold block having an aperture extending therethrough and into said cavity, a knockout pin positioned in said aperture and having one end thereof forming part of the parting face of said second mold block in the engaged position of said blocks, means for moving said second mold block with respect to said first mold block to open said cavity, means for arresting movement of said knockout pin upon such movement of said second mold block to cause said pin to project outwardly from said parting face thereof, and kickoff means coupled to said second mold block for movement therewith, said kickoff means including a finger portion movable into the space between said parting face of said second mold block and said end of said knockout pin, said finger portion moving further away from said parting face of said second block past said end of said knockout pin.

References Cited in the file of this patent

UNITED STATES PATENTS

| Number | Name | Date |
|---|---|---|
| 698,596 | Veeder | Apr. 29, 1902 |
| 701,311 | Dobson | June 3, 1902 |
| 1,339,712 | Pauly | May 11, 1920 |
| 1,661,007 | Payne | Feb. 28, 1928 |
| 2,107,190 | Shaw | Feb. 1, 1938 |
| 2,186,160 | Anderson | Jan. 9, 1940 |
| 2,187,212 | MacMillin | Jan. 16, 1940 |
| 2,198,713 | Wacker | Apr. 30, 1940 |
| 2,202,140 | Burroughs | May 28, 1940 |
| 2,227,263 | Knowles | Dec. 31, 1940 |
| 2,252,107 | Weida | Aug. 12, 1941 |
| 2,262,615 | Lester | Nov. 11, 1941 |
| 2,317,839 | Westin | Apr. 27, 1943 |
| 2,358,956 | Ashbaugh | Sept. 26, 1944 |
| 2,362,469 | Cousino | Nov. 14, 1944 |
| 2,364,745 | Moule | Dec. 12, 1944 |
| 2,391,362 | Strauss | Dec. 18, 1945 |
| 2,398,893 | Quarnstrom | Apr. 23, 1946 |
| 2,410,510 | Lester | Nov. 5, 1946 |
| 2,413,401 | Youngblood et al. | Dec. 31, 1946 |
| 2,420,405 | Alves | May 13, 1947 |
| 2,480,313 | Alden | Aug. 30, 1949 |